US011653416B2

(12) United States Patent
Das et al.

(10) Patent No.: US 11,653,416 B2
(45) Date of Patent: May 16, 2023

(54) TRIGGER-BASED (TB) PEER-TO-PEER (P2P) COMMUNICATION USING DIRECT LINK ANNOUNCEMENT (DiL-A) FOR NAV SETTING

(71) Applicant: Intel Corporation, Santa Clara, CA (US)

(72) Inventors: Dibakar Das, Hillsboro, OR (US); Laurent Cariou, Milizac (FR); Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 17/079,791

(22) Filed: Oct. 26, 2020

(65) Prior Publication Data

US 2021/0045192 A1 Feb. 11, 2021

Related U.S. Application Data

(60) Provisional application No. 62/926,667, filed on Oct. 28, 2019.

(51) Int. Cl.
*H04W 88/08* (2009.01)
*H04L 5/00* (2006.01)
*H04W 76/14* (2018.01)

(52) U.S. Cl.
CPC ........... *H04W 88/08* (2013.01); *H04L 5/0055* (2013.01); *H04W 76/14* (2018.02)

(58) Field of Classification Search
CPC ..... H04W 88/08; H04W 76/14; H04W 48/12; H04L 5/0055; H04L 5/0078; H04L 5/0053
See application file for complete search history.

(56) References Cited

U.S. PATENT DOCUMENTS

2015/0063251 A1* 3/2015 Asterjadhi ............ H04W 74/04
370/329
2018/0103487 A1* 4/2018 Asterjadhi .......... H04W 74/002
(Continued)

OTHER PUBLICATIONS

IEEE, Wireless LAN MAC and PHY Specifications (Year: 2020).*
(Continued)

*Primary Examiner* — Jung H Park
(74) *Attorney, Agent, or Firm* — Schwegman Lundberg & Woessner, P.A.

(57) ABSTRACT

Embodiments of an access point (AP) configured for extremely high throughput (EHT) operation may be configured to operate as a triggering AP for a trigger-based (TB) peer-to-peer (P2P) communication between a triggered direct (TD) station (STA) and a TD peer STA. The AP may encode a Direct Link Announcement (DiL-A) frame to schedule the TD STA for a direct link transmission to the TD peer STA. The DiL-A frame may be encoded to include a Duration/ID field. The AP may set the Duration/ID field of the DiL-A frame to a remaining duration of a transmission opportunity (TXOP) when the TD peer STA is an EHT STA that supports TB P2P operation (e.g., to allow the TD peer STA to ignore the NAV set by the DiL-A frame). The AP may set the Duration/ID field of the DiL-A frame to a response time for the TD STA to respond to the DiL-A frame when the TD Peer STA is a legacy STA (e.g., to allow the TD peer STA to set its NAV based on the response time).

20 Claims, 3 Drawing Sheets

(56) References Cited

U.S. PATENT DOCUMENTS

2021/0315036 A1* 10/2021 Jang ................... H04L 1/1887
2021/0320831 A1* 10/2021 Park ................... H04L 27/2621
2022/0369329 A1* 11/2022 Houghton ............. H04W 28/02

OTHER PUBLICATIONS

IEEE P802.11ah/D8.0, "Drafter Standard for Wireless LAN MAC and PHY Specification" (Year: 2016).*
IEEE 802.11-19/1117r0, "Direct Link MU transmissions", Jul. 15, 2019, Baron et al. (Year: 2019).*
IEEE 802.11-19/1604r0, "Triggered P2P follow-up", Aug. 23, 2019, Das et al. (Year: 2019).*

* cited by examiner

TRIGGER-BASED (TB) PEER-TO-PEER (P2P) COMMUNICATION USING DIRECT LINK ANNOUNCEMENT (DIL-A) FOR NAV SETTING

PRIORITY CLAIM

This application claims priority under 35 USC 119(e) to U.S. Provisional Patent Application Ser. No. 62/926,667, filed Oct. 28, 2019 [reference number AC5839-Z] which is incorporated herein by reference in its entirety.

TECHNICAL FIELD

Embodiments pertain to wireless communications. Some embodiments relate to wireless local area networks (WLANs). Some embodiments relate to trigger-based (TB) peer-to-peer (P2P) communication between stations (STAs). Some embodiments relate to WLAN communications in accordance with the IEEE 802.11be draft standard (i.e., Extremely High Throughput (EHT)).

BACKGROUND

Trigger based P2P operation has been proposed in EHT as a mechanism to leverage the high throughput direct link that may exist between two STAs instead of relaying via the AP. The P2P operation may provide low latency and high throughput data exchange between the two STAs. Some example use cases are direct transfer of a large file from phone to laptop, printing a set of documents at a wireless printer sitting next to a laptop, and control of wireless cameras from a phone. Trigger based operation on the other hand allows an AP to control degree of P2P transmissions. One issue with trigger based P2P operation is communication of the duration/ID field.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
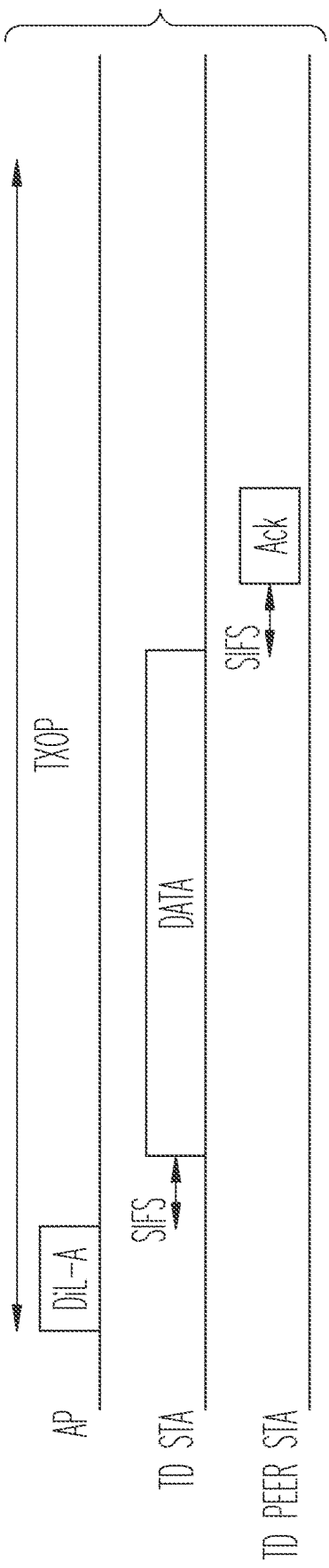
FIG. 1 illustrates trigger based (TB) peer-to-peer (P2P) operation in accordance with some embodiments.

Embodiments disclosed herein describe the transmission of the Duration/ID field during P2P operations. The basic sequence for TB P2P operation is shown in FIG. 1. In these embodiments, the AP first transmits a Direct Link Announcement (DiL-A) frame that schedules the Triggered Direct (TD) STA for direct link transmission to a TD Peer STA. Embodiments disclosed herein disclose how the STAs transmit Duration/ID field during the P2P operation. In some embodiments, the Duration/ID field for the DiL-A frame either equals the remaining duration in the TXOP or the duration just covering the response from the TD STA depending on whether the TD STA and the TD Peer STA are EHT STAs that support TB P2P operation and/or whether the two STAs are in the same BSS.

In some embodiments, when the TD Peer STA is an EHT STA that support the TB P2P operation and the STA is within the range of the Triggering AP, the Duration/ID field of the DiL-A frame may equal the remaining TXOP duration. The TD Peer STA ignores the NAV set by the DiL-A frame when deciding whether to respond to the TD STA.

In some embodiments, when the TD Peer STA is a legacy STA or is not aware of the Triggering AP, the Duration/ID field of the DiL-A frame equal just the time for the response frame from the TD STA if the AP allows the TD Peer STA to transmit a frame to the TD STA. The AP may make this decision after being requested by the TD STA.

In some embodiments, the allocation information is carried elsewhere in the DiL-A frame (e.g., inside a new A-Ctrl field or Mgt frame).

In some embodiments, the Duration/ID field of the frames transmitted by the TD and TD Peer STA may equal the remaining duration in their allocation if they are not both in the same BSS as the Triggering AP.

In some embodiments, the Duration/ID field of the frames transmitted by the TD and TD Peer STA may equal the remaining duration in the TXOP if they are both in the same BSS as the Triggering AP.

In some embodiments, the Triggering AP is aware of whether the TD Peer STA supports EHT TB P2P operation during TD setup.

In some embodiments, the TD Peer STA can be made aware of the Triggering AP during EHT TB P2P setup either directly from the Triggering AP or via the TD STA.

Figure 2:
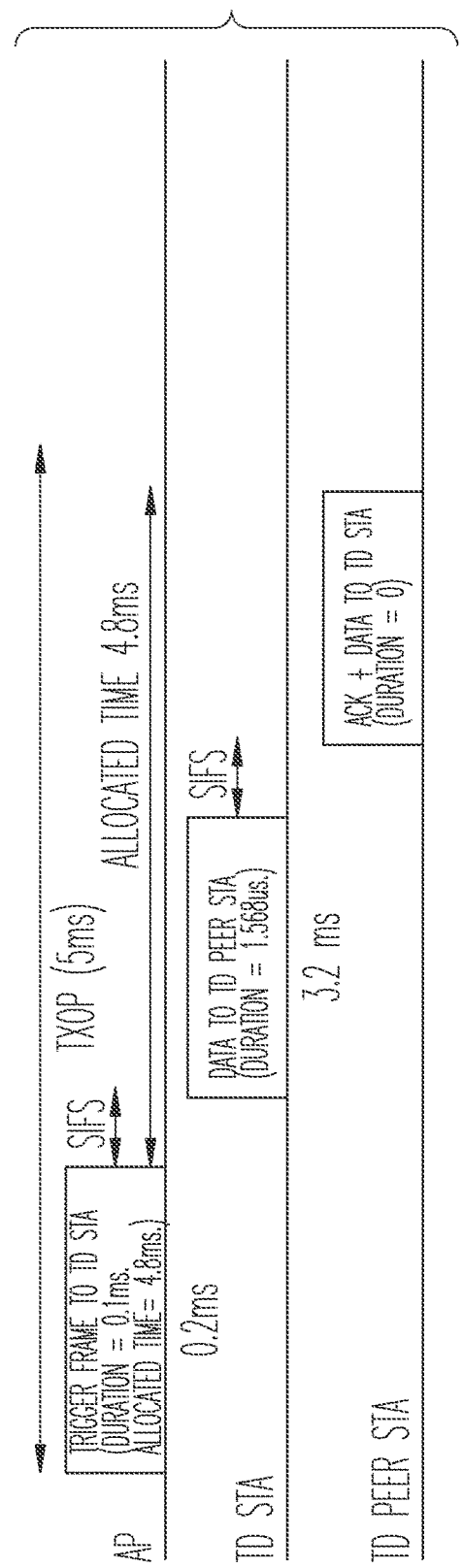
FIG. 2 illustrates duration/ID settings for trigger based (TB) peer-to-peer (P2P) operation when a BSS of a triggering access point (AP) is not the same as a triggered direct (TD) station (STA) and TD peer STA in accordance with some embodiments.

FIG. 2 shows an example of the Duration/ID settings when the BSS of the Triggering AP differs from that of either the TD STA and the TD Peer STA and the TD Peer STA does not necessarily support the EHT TB P2P operation. In these embodiments, the AP transmits the DiL-A frame with Duration/ID field set to 0.1 ms while the actual allocation is higher than that. The TD STA and the TD Peer STA transmits within the allocated time duration in a similar way as in baseline RDP.

Figure 3:
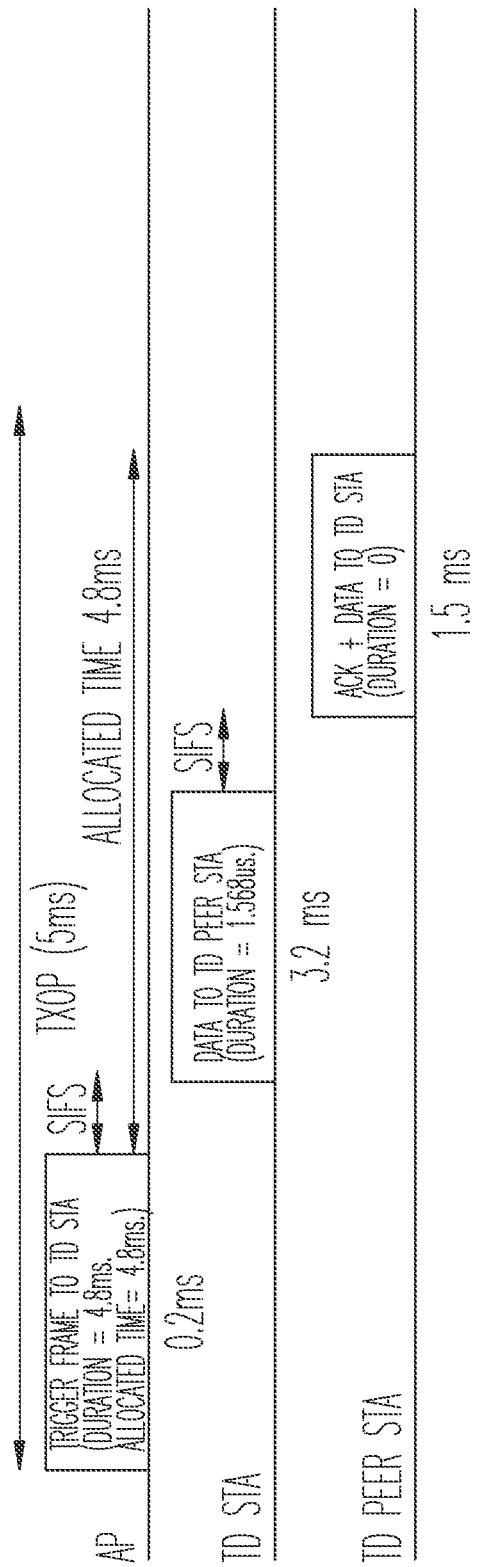
FIG. 3 illustrate duration/ID settings for TB P2P operation when the TD peer STA ignores a network allocation vector (NAV) set by the triggering AP in accordance with some embodiments.

FIG. 3 shows an example of the Duration/ID settings when the TD Peer STA supports the EHT TB P2P operation and the Triggering AP is aware of the same. In these embodiments, the AP transmits the DiL-A frame with Duration/ID field set to remaining TXOP duration of 4.8 ms which is also the allocated time for triggering operation. The TD STA and the TD Peer STA transmits within the allocated time duration in a similar way as in baseline RDP. FIG. 3 illustrates embodiments of Duration/ID settings when the TD Peer STA is allowed to ignore the NAV set by the Triggering AP.

Some embodiments are directed to access point (AP) configured for extremely high throughput (EHT) operation. In these embodiments, the AP may be configured to operate as a triggering AP for a trigger-based (TB) peer-to-peer (P2P) communication between a triggered direct (TD) station (STA) and a TD peer STA. In these embodiments, the AP may encode a Direct Link Announcement (DiL-A) frame to schedule the TD STA for a direct link transmission to the TD peer STA. The DiL-A frame may be encoded to include a Duration/ID field. In these embodiments, the AP may set the Duration/ID field of the DiL-A frame to a remaining duration of a transmission opportunity (TXOP) when the TD peer STA is an EHT STA that supports TB P2P operation (e.g., to allow the TD peer STA to ignore the NAV set by the DiL-A frame). In these embodiments, the AP may set the Duration/ID field of the DiL-A frame to a response time for the TD STA to respond to the DiL-A frame when the TD Peer STA is a legacy (e.g., a 0.11ax) STA (e.g., to allow the TD peer STA to set its NAV based on the response time).

In some embodiments, the DiL-A frame may be encoded to allocate time to the TD STA for the TB P2P communication. The allocated time may be up to the remaining duration of the TXOP. In some embodiments, the allocated time may include time for the TD STA to send a trigger frame comprising data to the TD peer STA and may include time for the TD peer STA to respond to the TD STA with a response frame that includes an acknowledgement (ACK) and data.

In these embodiments, when the TD peer STA is an EHT STA that supports TB P2P operation, the TD peer STA will ignore the NAV set by the DiL-A frame when deciding whether to respond to the data frame sent by the TD STA.

In these embodiments, when the TD peer STA is a legacy STA (e.g., a legacy 802.11 ax STA that does not support TB P2P operation), the Duration/ID field of the DiL-A frame is set by the AP to a response time for the TD STA to respond to the DiL-A frame and the basic NAV is not set at the TD peer STA. This prevents the legacy STA from setting is basic NAV to the TXOP duration allowing the TD peer STA to respond to the trigger frame sent by the TD STA.

In some embodiments, when the TD STA and the TD Peer STA are not in a same basic service set (BSS) as the triggering AP, the Duration/ID field of the trigger frame transmitted by the TD STA may be equal to a remaining duration allocated to the TD STA, and the Duration/ID field of the response frame transmitted by the TD Peer STA is equal to a remaining duration allocated to the TD Peer STA.

In some embodiments, the Duration/ID field of the trigger frame transmitted by the TD STA and the Duration/ID field of the response frame transmitted by the TD Peer STA may be equal to a remaining duration in the TXOP when the TD STA and the TD Peer STA are both in the same BSS as the triggering AP. In these embodiments, when the TD STA and TD Peer STA are in the same BSS, the basic network allocation vector (NAV) of both the TD STA and TD Peer STA are not set allowing the AP more flexibility in setting the duration/ID field of the DiL-A frame.

In some embodiments, prior to transmission of the DiL-A frame, the triggering AP may decode a request frame from the TD STA, the request frame requesting the direct link transmission to the TD peer STA.

In some embodiments, the triggering AP may set the Duration/ID field of the DiL-A frame to the remaining duration of the TXOP when the TD peer STA is an EHT STA that supports the TB P2P operation and the TD peer STA is within the range of the triggering AP (e.g., allowing the TD peer STA to ignore the NAV set by the DiL-A frame).

In some embodiments, the triggering AP may set the Duration/ID field of the DiL-A frame to the response time for the TD STA to respond to the DiL-A frame when the TD Peer STA is not aware of the triggering AP or when the TD peer STA is not within the range of the triggering AP (e.g., to allow the TD peer STA to set its NAV based on the response time).

In some embodiments, the DiL-A frame may be a trigger frame. In some embodiments, the DiL-A frame may initiate the TXOP, although the scope of the embodiments is not limited in this respect. In some embodiments, the DiL-A frame may be a trigger frame. In some embodiments, a PPDU sent by the TD STA to TD peer STA may be an 802.11ax TF if the TD STA is a soft-AP to its peer, although the scope of the embodiments is not limited this respect.

Some embodiments are directed to a non-access point station (STA) configured for extremely high throughput (EHT) operation. The STA may be configured to operate a triggered direct (TD) station (STA) for a trigger-based (TB) peer-to-peer (P2P) communication with a TD peer STA. In these embodiments, the STA may decode a Direct Link Announcement (DiL-A) frame from an access point (AP). The DiL-A frame may schedule the TD STA for a direct link transmission to the TD peer STA. The DiL-A frame may include a Duration/ID field. In these embodiments, the Duration/ID field of the DiL-A frame may be set to a remaining duration of a transmission opportunity (TXOP) when the TD peer STA is an EHT STA that supports TB P2P operation to allow the TD peer STA to ignore the NAV set by the DiL-A frame. In these embodiments, the Duration/ID field of the DiL-A frame may be set to a response time for the TD STA to respond to the DiL-A frame when the TD Peer STA is a legacy 0.11ax STA to allow the TD peer STA to set its NAV based on the response time.

In some embodiments, the DiL-A frame may allocate time to the TD STA for the TB P2P communication. In these embodiments, the allocated time may be up to the remaining duration of the TXOP. In some embodiments, the allocated time includes time for the TD STA to send a trigger frame comprising data to the TD peer STA and includes time for the TD peer STA to respond to the TD STA with a response frame that includes an acknowledgement (ACK) and data.

In some embodiments, the AP and STAs may communicate in accordance with one of the IEEE 802.11 standards. IEEE draft specification IEEE P802.11ax/D4.3, is incorporated herein by reference in its entirety.

Figure 4:
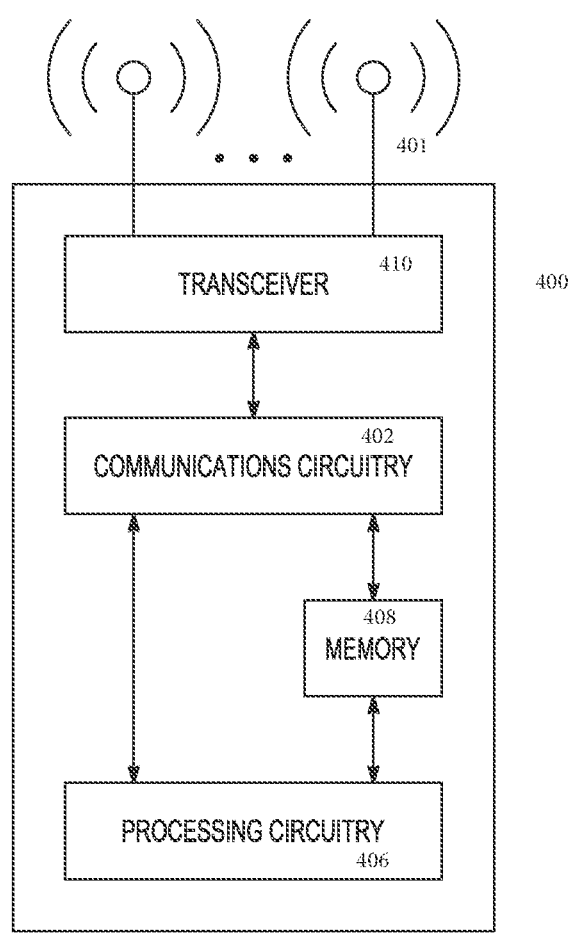
FIG. 4 illustrates a functional block diagram of a station (STA) in accordance with some embodiments.

In one embodiment, FIG. 4 illustrates a functional block diagram of a communication station that may be suitable for use as an AP STA or a non-AP STA as discussed above. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for access point (AP) configured for extremely high throughput (EHT) operation, the apparatus comprising: processing circuitry; and memory, the processing circuitry to:
   configure the AP to operate as a triggering AP for a trigger-based (TB) peer-to-peer (P2P) communication between a triggered direct (TD) station (STA) and a TD peer STA; and
   encode a Direct Link Announcement (DiL-A) frame to schedule the TD STA for a direct link transmission to the TD peer STA, the DiL-A frame encoded to include a Duration/ID field,
   wherein the processing circuitry is configured to:
   set the Duration/ID field of the DiL-A frame to a remaining duration of a transmission opportunity (TXOP) when the TD peer STA is an EHT STA that supports TB P2P operation; and
   set the Duration/ID field of the DiL-A frame to a response time for the TD STA to respond to the DiL-A frame when the TD Peer STA is a legacy STA.

2. The apparatus of claim 1, wherein the DiL-A frame is encoded to allocate time to the TD STA for the TB P2P communication, the allocated time being up to the remaining duration of the TXOP,
   wherein the allocated time includes time for the TD STA to send a trigger frame comprising data to the TD peer STA and includes time for the TD peer STA to respond to the TD STA with a response frame that includes an acknowledgement (ACK) and data.

3. The apparatus of claim 2, wherein when the TD STA and the TD Peer STA are not in a same basic service set (BSS) as the triggering AP:
   a Duration/ID field of the trigger frame transmitted by the TD STA is equal to a remaining duration allocated to the TD STA; and
   a Duration/ID field of the response frame transmitted by the TD Peer STA is equal to a remaining duration allocated to the TD Peer STA.

4. The apparatus of 3 wherein the Duration/ID field of the trigger frame transmitted by the TD STA and the Duration/ID field of the response frame transmitted by the TD Peer STA are equal to a remaining duration in the TXOP when the TD STA and the TD Peer STA are both in the same BSS as the triggering AP.

5. The apparatus of claim 4, wherein prior to transmission of the DiL-A frame, the processing circuitry of the triggering AP is configured to:
   decode a request frame from the TD STA, the request frame requesting the direct link transmission to the TD peer STA.

6. The apparatus of claim 1, wherein the processing circuitry of the triggering AP is configured to:
   set the Duration/ID field of the DiL-A frame to the remaining duration of the TXOP when the TD peer STA is an EHT STA that supports the TB P2P operation and the TD peer STA is within the range of the triggering AP.

7. The apparatus of claim 6, wherein the processing circuitry of the triggering AP is configured to:

set the Duration/ID field of the DiL-A frame to the response time for the TD STA to respond to the DiL-A frame when the TD Peer STA is not aware of the triggering AP or when the TD peer STA is not within the range of the triggering AP.

8. The apparatus of claim 1, wherein the DiL-A frame is a trigger frame.

9. The apparatus of claim 1, wherein the AP is an EHT AP configured to operate in accordance with an IEEE 802.11be standard.

10. The apparatus of claim 1, wherein the processing circuitry comprises a baseband processor, and wherein the AP comprises two or more antennas.

11. A non-transitory computer-readable storage medium that stores instructions for execution by processing circuitry for an access point (AP) configured for extremely high throughput (EHT) operation, the instructions to configure the processing circuitry to:
configure the AP to operate as a triggering AP for a trigger-based (TB) peer-to-peer (P2P) communication between a triggered direct (TD) station (STA) and a TD peer STA; and
encode a Direct Link Announcement (DiL-A) frame to schedule the TD STA for a direct link transmission to the TD peer STA, the DiL-A frame encoded to include a Duration/ID field,
wherein the processing circuitry is configured to:
set the Duration/ID field of the DiL-A frame to a remaining duration of a transmission opportunity (TXOP) when the TD peer STA is an EHT STA that supports TB P2P operation; and
set the Duration/ID field of the DiL-A frame to a response time for the TD STA to respond to the DiL-A frame when the TD Peer STA is a legacy STA.

12. The non-transitory computer-readable storage medium of claim 11, wherein the DiL-A frame is encoded to allocate time to the TD STA for the TB P2P communication, the allocated time being up to the remaining duration of the TXOP,
wherein the allocated time includes time for the TD STA to send a trigger frame comprising data to the TD peer STA and includes time for the TD peer STA to respond to the TD STA with a response frame that includes an acknowledgement (ACK) and data.

13. The non-transitory computer-readable storage medium of claim 12, wherein when the TD STA and the TD Peer STA are not in a same basic service set (BSS) as the triggering AP:
a Duration/ID field of the trigger frame transmitted by the TD STA is equal to a remaining duration allocated to the TD STA; and
a Duration/ID field of the response frame transmitted by the TD Peer STA is equal to a remaining duration allocated to the TD Peer STA.

14. The non-transitory computer-readable storage medium of 13 wherein the Duration/ID field of the trigger frame transmitted by the TD STA and the Duration/ID field of the response frame transmitted by the TD Peer STA are equal to a remaining duration in the TXOP when the TD STA and the TD Peer STA are both in the same BSS as the triggering AP.

15. The non-transitory computer-readable storage medium of claim 14, wherein prior to transmission of the DiL-A frame, the processing circuitry of the triggering AP is configured to:
decode a request frame from the TD STA, the request frame requesting the direct link transmission to the TD peer STA.

16. The non-transitory computer-readable storage medium of claim 11, wherein the processing circuitry of the triggering AP is configured to:
set the Duration/ID field of the DiL-A frame to the remaining duration of the TXOP when the TD peer STA is an EHT STA that supports the TB P2P operation and the TD peer STA is within the range of the triggering AP.

17. The non-transitory computer-readable storage medium of claim 16, wherein the processing circuitry of the triggering AP is configured to:
set the Duration/ID field of the DiL-A frame to the response time for the TD STA to respond to the DiL-A frame when the TD Peer STA is not aware of the triggering AP or when the TD peer STA is not within the range of the triggering AP.

18. The non-transitory computer-readable storage medium of claim 11, wherein the DiL-A frame is a trigger frame.

19. An apparatus for a non-access point station (STA) configured for extremely high throughput (EHT) operation, the apparatus comprising: processing circuitry, and memory, the processing circuitry to:
configure the STA to operate a triggered direct (TD) station (STA) for a trigger-based (TB) peer-to-peer (P2P) communication with a TD peer STA; and
decode a Direct Link Announcement (DiL-A) frame from an access point (AP), the DiL-A frame to schedule the TD STA for a direct link transmission to the TD peer STA, the DiL-A frame including a Duration/ID field,
wherein the Duration/ID field of the DiL-A frame is set to a remaining duration of a transmission opportunity (TXOP) when the TD peer STA is an EHT STA that supports TB P2P operation [to allow the TD peer STA to ignore the NAV set by the DiL-A frame]; and
wherein the Duration/ID field of the DiL-A frame is set to a response time for the TD STA to respond to the DiL-A frame when the TD Peer STA is a legacy STA.

20. The apparatus of claim 19, wherein the DiL-A frame allocates time to the TD STA for the TB P2P communication, the allocated time being up to the remaining duration of the TXOP,
wherein the allocated time includes time for the TD STA to send a trigger frame comprising data to the TD peer STA and includes time for the TD peer STA to respond to the TD STA with a response frame that includes an acknowledgement (ACK) and data.

* * * * *

UNITED STATES PATENT AND TRADEMARK OFFICE
CERTIFICATE OF CORRECTION

| | |
|---|---|
| PATENT NO. | : 11,653,416 B2 |
| APPLICATION NO. | : 17/079791 |
| DATED | : May 16, 2023 |
| INVENTOR(S) | : Das et al. |

It is certified that error appears in the above-identified patent and that said Letters Patent is hereby corrected as shown below:

In the Claims

In Column 6, Line 47, in Claim 4, delete "3" and insert --claim 3,-- therefor

Signed and Sealed this
Third Day of September, 2024

Katherine Kelly Vidal
*Director of the United States Patent and Trademark Office*